M. C. A. LATOUR.
SPEED INDICATOR FOR CONTINUOUS OR ALTERNATING CURRENT MOTORS.
APPLICATION FILED FEB. 23, 1909.

1,117,144.

Patented Nov. 10, 1914.

Witnesses

Inventor:
Marius C. A. Latour.
by
Atty.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

SPEED-INDICATOR FOR CONTINUOUS OR ALTERNATING CURRENT MOTORS.

1,117,144.

Specification of Letters Patent. Patented Nov. 10, 1914.

Application filed February 23, 1909. Serial No. 479,550.

*To all whom it may concern:*

Be it known that I, MARIUS C. A. LATOUR, a citizen of France, residing at Paris, France, have invented certain new and useful Improvements in Speed-Indicators for Continuous or Alternating Current Motors, of which the following is a specification.

My invention relates to speed indicators for electric motors and its object is to provide a simple and reliable method of and apparatus for determining the speed of rotation of an electric motor.

My invention is based upon the following principle; if the potential applied to the terminals of a continuous current motor is designated by V, the resistance of the armature by R, and the current absorbed in the motor by I, it is possible to derive the equation $$N = \frac{V - IR}{KO},$$

in which N designates the number of rotations per second of the motor, K a constant and O the flux in the inducing members of the motor. In reality, O is a function either of V, in the case of shunt motors, or of I, in the case of series motors. It may be said that N is a function of the two variables V and I and it is therefore possible to conceive of devices which give the speed as a function of V and of I.

In the case of a series motor, the flux is a certain function of the current O I, and in this case the equation becomes $$N = \frac{V - IR}{KO(I)}.$$

If both the saturation and the resistance of the armature are neglected, the speed is evidently proportional to the apparent resistance of the motor and in carrying out my invention, the apparent resistance of the motor is measured by any suitable device and thereby an indication of the speed of the motor is secured. Various forms of measuring devices may be used, but in the preferred construction, an apparatus similar to an ohm meter is employed.

My invention will best be understood in connection with the accompanying drawing, showing diagrammatically one of the various forms of apparatus in which the invention may be embodied and by means of which the method may be practised.

Figure 1:
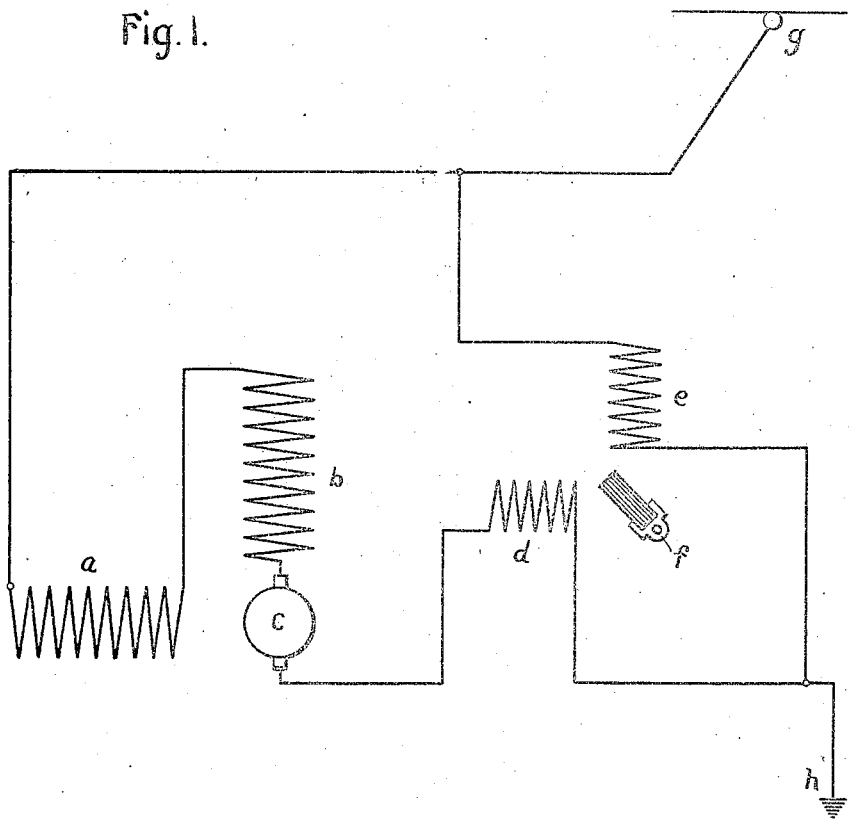
Figure 2:
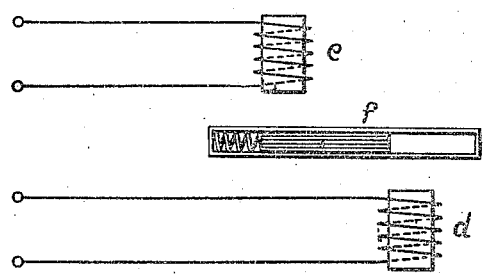

In the drawings, Figure 1 shows diagrammatically a speed indicator embodying my invention and applied to a series traction motor; and Fig. 2 shows a relay operating on the same principle and having an armature responsive to the speed of an alternating current motor.

In the arrangement shown in Fig. 1, which is only a diagram and does not attempt to show any details of construction, a series traction motor having an exciting winding $a$, a compensating winding $b$ and an armature winding $c$ is connected in series between the trolley indicated by $g$ and the ground marked $h$. In the specific form of apparatus shown in the drawings, a coil $e$ is energized by the potential at the terminals of the motor and gives a flux perpendicular to the flux produced by a coil $d$, which is connected in series with the motor and therefore is traversed by the current through the motor. A suitably mounted armature or bar of soft iron, $f$, takes the direction of the resultant field produced by the two coils $d$ and $e$ and by its direction measures the speed of the motor.

The same apparatus will act on alternating current series or repulsion motors if in some suitable way the apparatus is prevented from becoming the seat of a rotary field adapted to give the bar or armature $f$ a rotary movement.

The arrangement diagrammatically shown in Fig. 2 operates on the same principle and causes the position of an armature $f$ to be varied in response to the speed of an alternating current motor. The armature $f$ is attracted on one hand by the coil $e$ excited in derivation or shunt to the motor and on the other hand by the coil $d$ excited in series with the motor. Under these conditions the action of the coil $d$ predominates at low speed and the action of the coil $e$ predominates at high speed, consequently the armature $f$ will change position at a certain definite and predetermined speed of the motor.

In accordance with the provisions of the patent statutes, I have described the principle of operation of my invention, together with the apparatus which I consider to be the best embodiment thereof, but I do not limit myself to this particular embodiment and seek in the appended claims to cover all embodiments which shall be within the scope of my invention and obvious to those skilled in the art.

What I claim as new and desire to secure by Letters Patent of the United States, is:—

1. The method of measuring the speed of an electric motor which consists in compounding two magnetic fluxes, one depending upon the voltage applied to the motor and the other on the current flowing through the motor, and causing said fluxes so compounded to act upon an indicating member so as to cause it to take the direction of the resultant field.

2. A speed responsive device for electric motors comprising means for producing a magnetic flux dependent on the voltage applied to the motor, means for producing a second magnetic flux dependent on the current through the motor and displaced in position from the first flux, and an indicating member mounted to move in response to the resultant of said fluxes to assume a position dependent upon the direction of this resultant.

In witness whereof I have hereunto set my hand this 10th day of February, 1909.

MARIUS C. A. LATOUR.

Witnesses:
ELWOOD AUSTEN WELDEN,
JOHN BAKER.